(12) United States Patent
Miura

(10) Patent No.: US 8,214,537 B2
(45) Date of Patent: Jul. 3, 2012

(54) DOMAIN NAME SYSTEM USING DYNAMIC DNS AND GLOBAL ADDRESS MANAGEMENT METHOD FOR DYNAMIC DNS SERVER

(75) Inventor: Satoshi Miura, Hamburg (DE)

(73) Assignee: Yamaha Corporation (JP)

( * ) Notice: Subject to any disclaimer, the term of this patent is extended or adjusted under 35 U.S.C. 154(b) by 269 days.

(21) Appl. No.: 12/162,709

(22) PCT Filed: Jan. 30, 2007

(86) PCT No.: PCT/JP2007/051495
§ 371 (c)(1),
(2), (4) Date: Nov. 17, 2008

(87) PCT Pub. No.: WO2007/086578
PCT Pub. Date: Aug. 2, 2007

(65) Prior Publication Data
US 2009/0106453 A1    Apr. 23, 2009

(30) Foreign Application Priority Data
Jan. 30, 2006 (JP) .................. P2006-021369

(51) Int. Cl.
*G06F 15/16* (2006.01)
*G06F 15/173* (2006.01)
*H04L 12/28* (2006.01)

(52) U.S. Cl. .................. 709/252; 709/225; 370/389

(58) Field of Classification Search .......... 709/252
See application file for complete search history.

(56) References Cited

U.S. PATENT DOCUMENTS
7,451,234 B1 * 11/2008 Bonner .................. 709/245
(Continued)

FOREIGN PATENT DOCUMENTS
JP     2005-027254 A     1/2005
(Continued)

OTHER PUBLICATIONS
International search report issued in corresponding application No. PCT/JP2007/051495, no English translation is readily available.
Dynamic DNS "Dynamic Updates in the Domain Name System"; website: http://e-words.jp/w/DDNS.html. English abstract provided.

*Primary Examiner* — Peling Shaw
*Assistant Examiner* — Joiya Cloud
(74) *Attorney, Agent, or Firm* — Rossi, Kimms & McDowell LLP

(57) ABSTRACT

In order to constitute a domain name system obtained by providing and utilizing a DNS service by using a self-supporting (not rented) DDNS server in a dynamic IP address environment, a DDNS server inside a network of a central site and routers which are DDNS clients inside networks of other sites are provided. The DDNS server includes: a means for registering a relationship between domain names of the DDNS clients and global addresses of the DDNS client; a means for responding to a request for resolving a name from the DDNS client; and a means which, at a time when a global address of the DDNS server is updated, notifies DDNS server information including the global address of the DDNS server to the DDNS client. Moreover, the DDNS client includes: a means for registering (updating) the global address of the DDNS server when the DDNS server information is notified; and a means for issuing a request for resolving a name to the DDNS server.

2 Claims, 5 Drawing Sheets

U.S. PATENT DOCUMENTS

| | | | |
|---|---|---|---|
| 7,529,810 B2 * | 5/2009 | Goto et al. | 709/219 |
| 2003/0177236 A1 * | 9/2003 | Goto et al. | 709/225 |
| 2004/0125801 A1 * | 7/2004 | Nawata | 370/389 |
| 2004/0202120 A1 * | 10/2004 | Hanson | 370/328 |
| 2006/0159084 A1 * | 7/2006 | Shimizu et al. | 370/389 |

FOREIGN PATENT DOCUMENTS

| | | |
|---|---|---|
| JP | 2005-204343 A | 7/2005 |
| JP | 2005-269666 A | 9/2005 |

* cited by examiner

… (1) …

DOMAIN NAME SYSTEM USING DYNAMIC DNS AND GLOBAL ADDRESS MANAGEMENT METHOD FOR DYNAMIC DNS SERVER

TECHNICAL FIELD

The present invention relates to a domain name system using a dynamic DNS and a global address management method for a dynamic DNS server.

Priority is claimed on Japanese Patent Application No. 2006-21369, filed Jan. 30, 2006, the content of which is incorporated herein by reference.

BACKGROUND ART

In the conventional art, in a case in which such as a Web server is provided at a host to which a dynamic global IP address is assigned, in order to access the Web server by using a domain name, a DDNS (dynamic DNS) service is provided in which the Web server is accessed by using a domain name obtained by adding a sub domain name to a domain name that is not originally assigned to the Web server (see Non-Patent Document 1 below). In order to use such a DDNS service, a router provides a function (DDNS client function) which notifies the latest global IP address to a DDNS server when the above-described dynamic global IP address is updated.

By using the above-described DDNS service, for example, it is possible to set up or launch a Web server in one business establishment and to use the Web server for opening a homepage dedicated to clients, customers and company workers.

Non-Patent Document 1: "IT words dictionary e-Words" [online], [searched in Jan. 23, 2006], Internet address <http://e-wordsjp/w/DDNS.html>, by Incept Inc.

However, in a case in which the business establishment becomes larger, for example, in a case in which networks of multiple sites are connected to each other by using a VPN (Virtual Private Network), it is necessary to obtain a self-supporting (not rented) DDNS server. On the other hand, it is necessary to launch the DDNS server by using a host which has a fixed global address. Therefore, in order to obtain the self-supporting (not rented) DDNS server, it is necessary to obtain the fixed global address for the host. However, there is a problem in that it is costly to obtain and maintaining the fixed IP address.

DISCLOSURE OF INVENTION

The present invention has an object to provide a domain name system obtained by providing and utilizing a DNS service by using a self-supporting (not rented) DDNS server in a dynamic IP address environment without assigning a fixed IP address to the DDNS server.

In order to solve the above-described problems, the present invention may provide the following constitutions.

A domain name system preferably includes a DDNS server and a DDNS client, wherein the DDNS server includes: a DDNS client information registration portion registering DDNS client information which indicates the relationship between a domain name of the DDNS client and a global address of the DDNS client; a responding portion which, in response to a request for resolving a name from the DDNS client, extracts the corresponding global address from the DDNS client information and responds to the DDNS client; and a DDNS server information notification portion which, at a time when a global address of the DDNS server is updated or at a scheduled time, notifies DDNS server information including the global address of the DDNS server to the DDNS client registered by the DDNS client information registration portion, and the DDNS client includes: a DDNS server information registration portion which, when the DDNS server information is notified by the DDNS server, registers the global address of the DDNS server included in the DDNS server information; and a DDNS client information notification portion notifying the relationship between the domain name of the DDNS client and the global address of the DDNS client to the DDNS server.

Moreover, it is preferable that, with regard to the above-described domain name system, the DDNS server information notification portion further include: a transmission portion transmitting an authentication message including a transmission source address information to the DDNS client; and an authentication data transmission/reception portion transmitting/receiving authentication data to/from the DDNS client, and the DDNS server information registration portion further include: a reception portion receiving the authentication message; and a DDNS server authentication portion which transmits/receives the authentication data to/from the DDNS server and authenticates the DDNS server.

Moreover, it is preferable that, with regard to the above-described domain name system, the authentication data transmission/reception portion generate a hash value by using the authentication data received from the DDNS client and transmit the hash value to the DDNS client, the DDNS server authentication portion further include an authentication data generation and transmission portion which receives the authentication message, generates authentication data and transmits the authentication data to the DDNS server, and the DDNS server authentication portion generate a hash value by using the authentication data and the encryption key and compares the generated hash value and the received hash value from the DDNS server.

Furthermore, a global address management method of the present invention preferably includes: a step in which, at the time when a global address of a DDNS server is updated or at a scheduled time, DDNS server information is notified which includes a global address of the DDNS server to a DDNS client that has been registered to a DDNS client information registration portion; a step in which, when the DDNS server notifies the DDNS server information to the DDNS client, the DDNS client registers the global address of the DDNS server included in the DDNS server information; and a step of notifying DDNS information which indicates a relationship between a domain name of the DDNS client and a global address of the DDNS client to the DDNS server.

In response to a change or an update of the global address of the DDNS server or in accordance with a predetermined schedule, the DDNS server notifies the DDNS server information including the global address of the DDNS server to the DDNS client, and the DDNS client updates the locally stored global address of the DDNS server. Therefore, it is possible to provide a DDNS server by using a host which has a dynamic global address, and it is possible to provide and utilize a DDNS service in a dynamic IP address environment.

Moreover, the authentication message and the authentication data are exchanged between the DDNS server and the DDNS client, and the DDNS client authenticates the DDNS server. Therefore, it is possible to assure correct operations of the above-described domain name system because the regular DDNS server and the DDNS client conduct operations (registration of the above-described DDNS server information).

Moreover, the above-described DDNS server and the DDNS client generate hash values by using the authentication data and the encryption key, and conduct the authentication operation by using the hash values. Therefore, it is possible to conduct the authentication operation with high accuracy.

BEST MODE FOR CARRYING OUT THE INVENTION

Figure 1A:
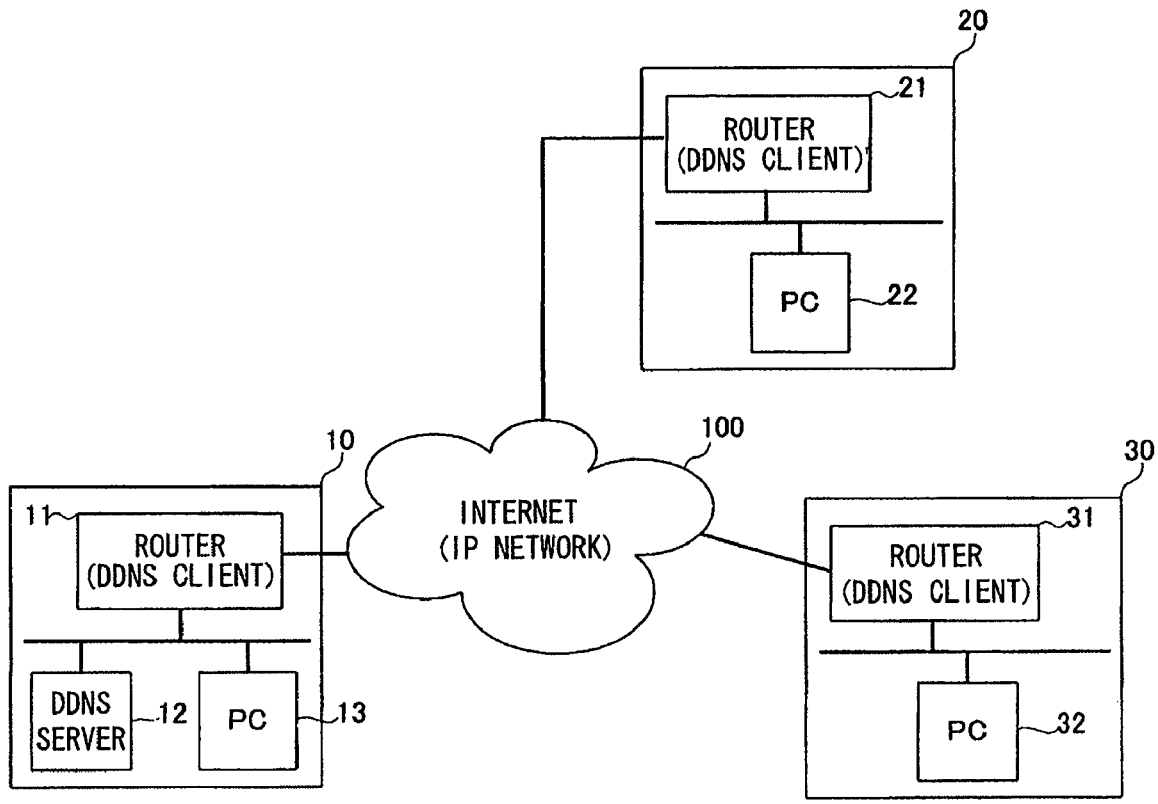
FIG. 1A is a block diagram showing an overall constitution of a domain name system of one embodiment of the present invention.

In reference to the drawings, a constitution of a domain name system of one embodiment of the present invention is explained. FIG. 1A is a block diagram showing an overall constitution of a network including the domain name system. As shown in FIG. 1A, networks (LAN) 10, 20 and 30 located at multiple sites are connected to the Internet (IP network) 100. Here, the network 10 is a LAN of a central site and provides a DDNS server 12 and a router (DDNS client) 11. The router (DDNS client) 11 is a router via which the DDNS server 12 connects to the Internet, and it is possible to assign a global address which can be referred via the Internet to the DDNS server 12. Moreover, the router (DDNS client) 11 has a function of a DDNS client which accesses the DDNS server in order to resolve a name. The networks of other sites provide routers (DDNS clients) 21 and 31 which use the above-described DDNS server 12. Moreover, the routers 11, 21 and 31 of the networks 10, 20 and 30 have functions for building VPN and communicating among predetermined sites via the VPN. Furthermore, the networks of the sites provide computers 13, 22 and 32 which are terminals for processing information inside the sites and among sites.

Figure 1B:
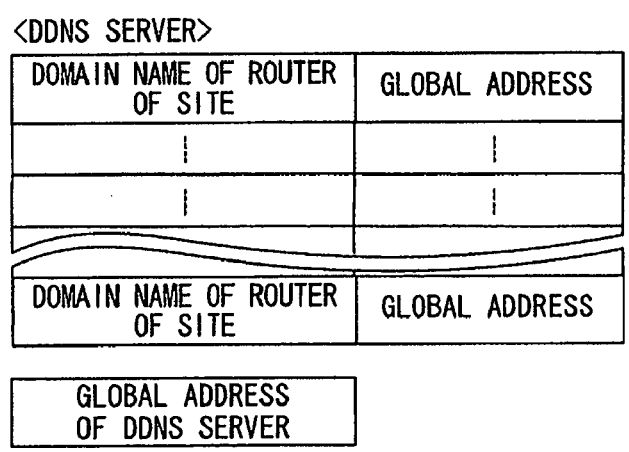
FIG. 1B is a drawing which shows primal data obtained by a DDNS server.
Figure 1C:
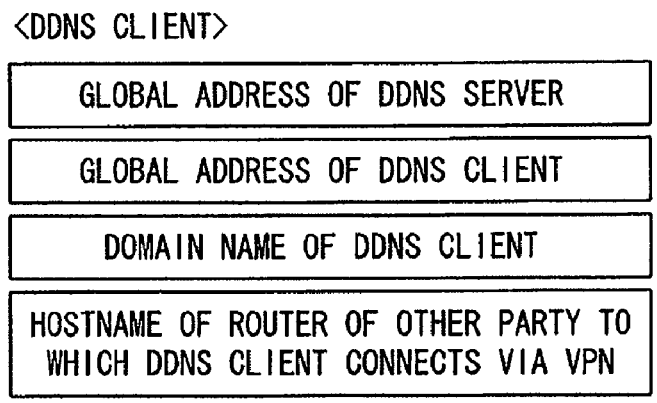
FIG. 1C is a drawing which shows primal data obtained by a DDNS client.

FIG. 1B is a drawing which shows primal data provided by the above-described DDNS server 12, and FIG. 1C is a drawing which shows primal data provided by the above-described DDNS client.

The DDNS server 12 stores a table which indicates a relationship between global addresses assigned to the routers of the sites and domain names corresponding to the global addresses.

Moreover, the DDNS server 12 maintains information of its own global address which is assigned by an ISP (Internet Service Provider).

On the other hand, the DDNS client maintains the global address of the DDNS server which has been notified by the DDNS server, a global address which has been assigned to the DDNS client (router) itself, its own domain name and a hostname of a router of another party to which the DDNS client connects via VPN.

The DDNS server 12 of the central site and the router (DDNS client) 11 respectively maintain local address information (for example, a link local address if IPv6, and a private IP address if IPv4) which can be used in order to communicate inside the network 10 of the central site.

Figure 2A:
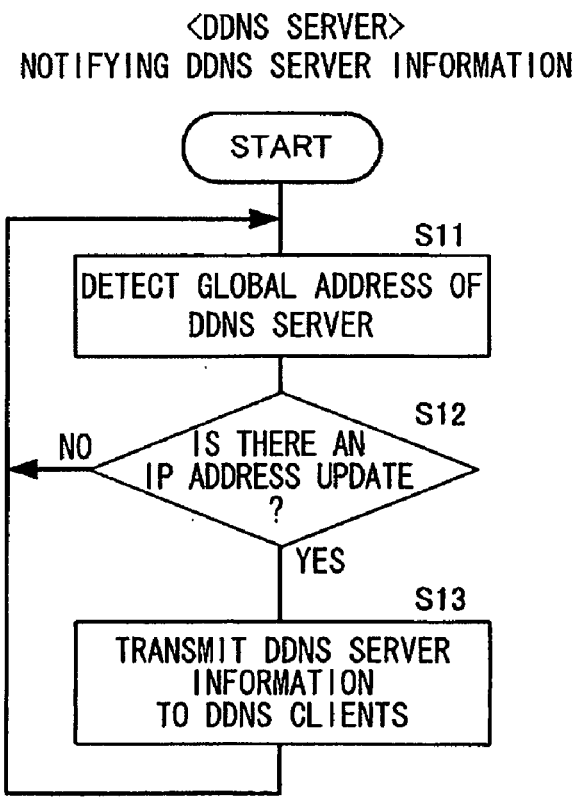
FIG. 2A is a flowchart which shows operations of a DDNS server.
Figure 2B:
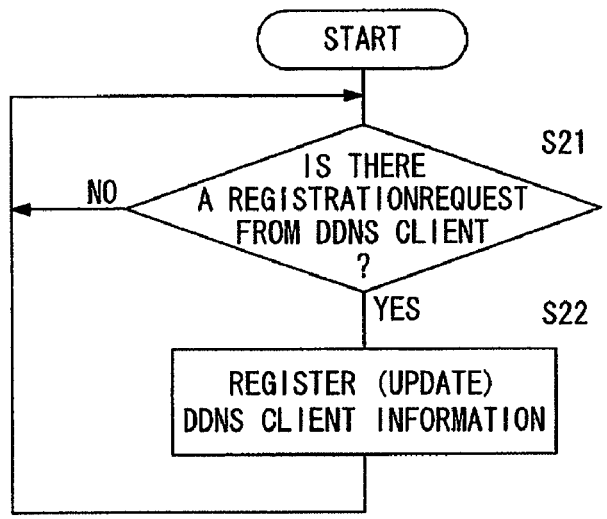
FIG. 2B is a flowchart which shows operations of a DDNS server.

FIGS. 2A and 2B are flowcharts which show operations of the DDNS server shown in FIG. 1A. FIG. 2A shows a transmission operation of DDNS server information. In this operation, first, the DDNS server obtains its own global address (a global address obtained by combining a network prefix specified by the ISP and an interface identifier if IPv6, and a global IP address assigned by the ISP if IPv4). If there are changes or updates of the global address (a reassignment by the ISP), the DDNS server transmits the DDNS server information including the updated global address to the DDNS clients (S11→S12→S13). However, with regard to the network 10 of the central site at which the DDNS server is provided, the DDNS server 12 does not transmit the server information to the router (DDNS client) 11 of the central site because the communication is conducted by using local addresses.

FIG. 2B is a flowchart with regard to operations of registering DDNS client information. First, the DDNS server waits for a registration request of the DDNS client information from the DENS client, and registers (or updates) the DDNS client information if the request is received. That is, a correspondence between a domain name of the router (DDNS client) and a global address of the router included in the DDNS client information is registered (or updated).

Figure 3A:
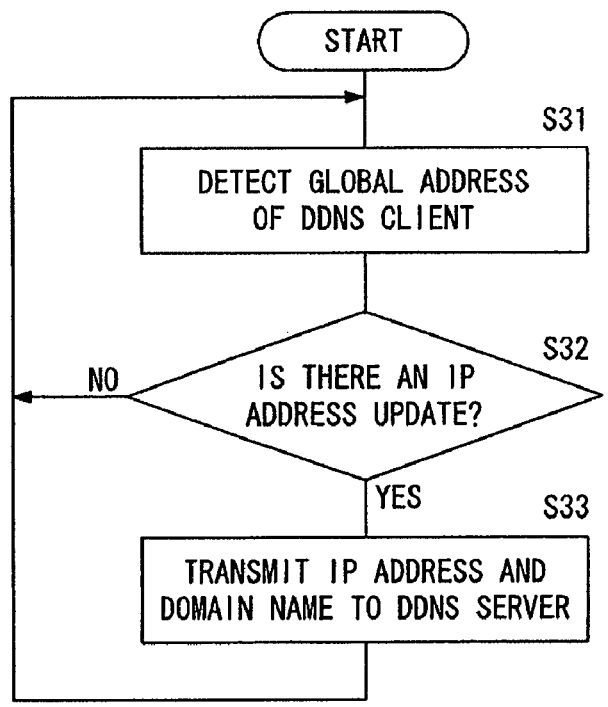
FIG. 3A is a flowchart which shows operations of a DDNS client.
Figure 3B:
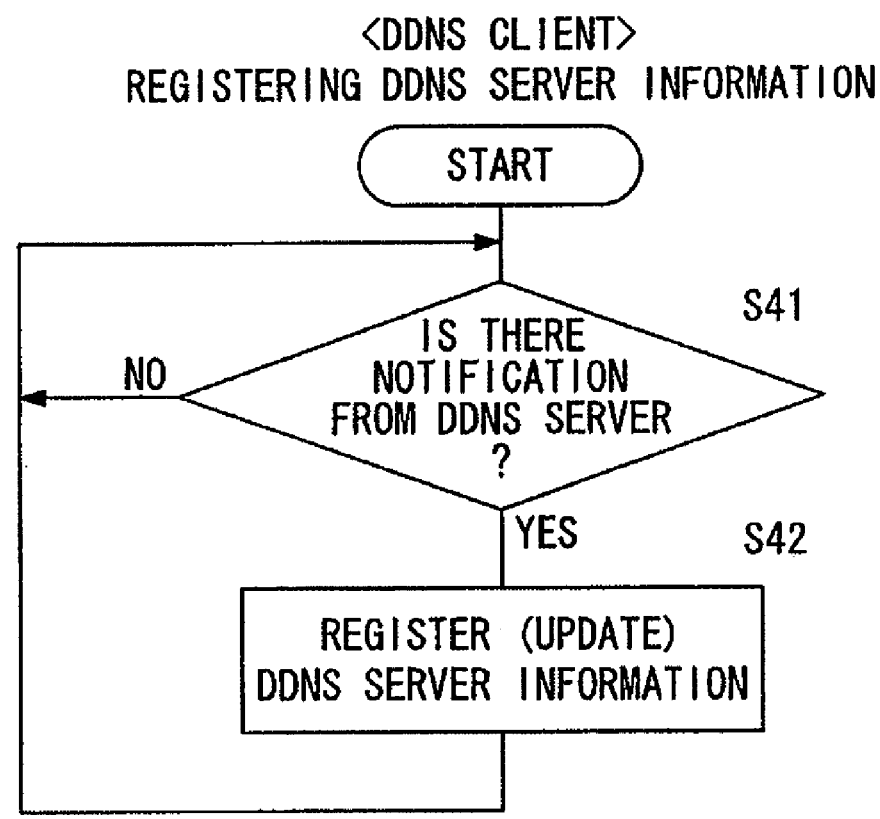
FIG. 3B is a flowchart which shows operations of a DDNS client.

FIGS. 3A and 3B are drawings which show flowcharts of operations that relate to the DDNS client. FIG. 3A shows operations of notifying the DDNS client information. First, a global IP address of the DDNS client is obtained. If there is a change or an update of the global IP address, the DDNS client information including the global IP address and the domain name is transmitted to the DDNS server (S31→S32→S33). It should be noted that the router (DDNS client) 11 inside the network 10 of the central site transmits the DDNS client information to the DDNS server 12 by using the local address because the router 11 is inside the same network address as the DDNS server 12.

FIG. 3B shows operations which relate to a registration of the DDNS server information. First, if there is a notification of the DDNS server information from the DDNS server 12, the global address of the DDNS server included in the DDNS server information is registered (S41→S42).

It should be noted that the global address of the DDNS server is manually set to each of the DDNS clients only for the first time before conducting normal operations of the DDNS client shown in FIG. 3A. It is possible to conduct such an operation, for example, by a staff who finds the global address which is assigned to the DDNS server 12 of the central site and notifies staff of other sites.

Figure 4:
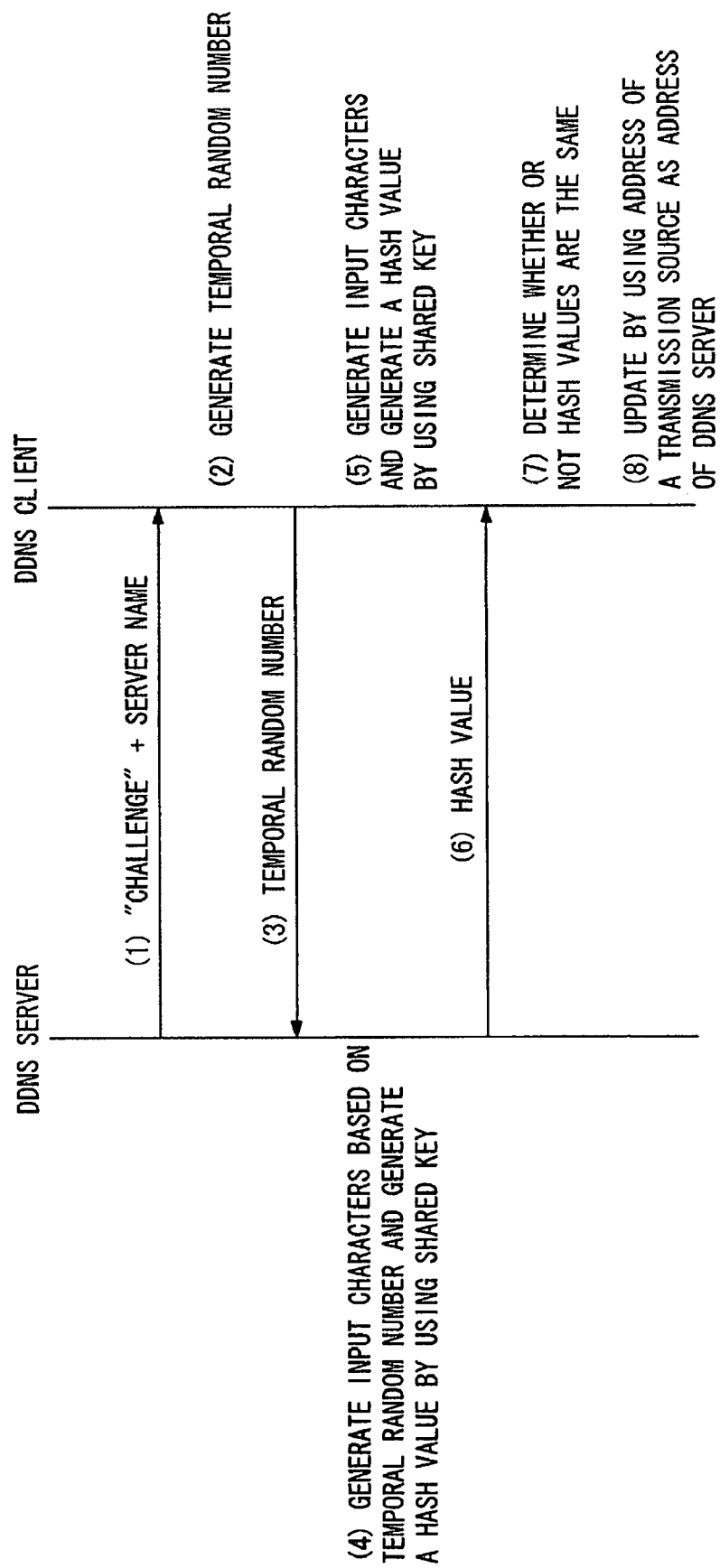
FIG. 4 is a drawing which shows steps of authentication between a DDNS server and a DDNS client.

FIG. 4 shows steps of an authentication operation which is conducted between the DDNS server and the DDNS client when the DDNS server information is notified at Step S13 shown in FIG. 2A.

First, the DDNS server transmits a message including, for example, characters of "get challenge" and the name of the DDNS server to the DDNS client.

(2) The DDNS client generates a temporal random number.

(3) The DDNS client transmits the temporal random number to the DDNS server.

(4) The DDNS server obtains input characters by appending other predetermined information (characters) to the received temporal random number, and generates a hash value by using a shared key (encryption key) which is commonly obtained by both the DDNS server and the DDNS client and by applying such as MD5 (Message Digest 5).

(5) On the other hand, the DDNS client uses the temporal random number as described above, generates the input characters by using both the temporal random number and the above-described predetermined information, and generates the hash value by applying the above-described shared key to the input characters.

(6) The DDNS server transmits the above-described hash value to the DDNS client.

(7) The DDNS client determines whether or not the received hash value and the hash value which has been generated by the DDNS client itself are the same.

(8) If both of the hash values are the same, the address of a transmission source included in the message of (1) is recognized as the global address of the DDNS server, and the DDNS server information is updated.

In an example shown in FIG. 4, the DDNS client conducts an authentication operation with regard to the DDNS server. It should be noted that it is possible to use the above-described authentication method when the DDNS client notifies the DDNS client information to the DDNS server. In such a case, functions of the DDNS server and the DDNS client shown in FIG. 4 are just reversed. That is, the DDNS client transmits a message to the DDNS server, and the DDNS server generates and transmits a temporal random number to the DDNS client, and then both of them generate input characters and generate a hash value. The DDNS server updates the DDNS client information if both the hash values are the same.

Moreover, in an example shown in FIG. 2A, the DDNS server information is notified to the DDNS clients when an update or a change of the global address of the DDNS server is detected. However, it is possible that the DDNS information is notified in accordance with a schedule. That is, it is possible that a change or an update of the global address of the DDNS server be detected in accordance with a predetermined time cycle or at a predetermined time, and the DDNS server information be notified to the DDNS clients if there is a change or an update. Moreover, it is possible that regardless of whether or not there is a change or an update of the global address, the latest DDNS server information be notified to the DDNS clients at every predetermined time in accordance with the above-described schedule.

INDUSTRIAL APPLICABILITY

In accordance with the above-described DDNS server, a host which has a global address that is not fixed can be the DDNS server, and it is possible to provide and use the DDNS service even in an environment using dynamic IP addresses.

The invention claimed is:

1. A domain name system comprising:
a DDNS server having assigned a non-static global IP address; and
a DDNS client also having assigned another non-static global IP address,
wherein the DDNS server comprises:
a DDNS client information registration portion that registers DDNS client information indicating a relationship between a domain name of the DDNS client and the non-static global IP address of the DDNS client;
a responding portion that, in response to a request for resolving a name from the DDNS client, extracts the corresponding non-static global IP address from the DDNS client information and responds to the DDNS client; and
a DDNS server information notification portion that, at a time when the non-static global IP address of the DDNS server is updated or at a predetermined scheduled time, notifies DDNS server information, which includes the non-static global IP address of the DDNS server, to the DDNS client registered by the DDNS client information registration portion, wherein the DDNS server information notification portion comprises:
a transmission portion that transmits an authentication message, including transmission source address information, to the DDNS client; and
an authentication data transmission/reception portion that transmits/receives authentication data to/from the DDNS client,
wherein the DDNS client comprises:
a DDNS server information registration portion that, when the DDNS server information notification portion notifies the DDNS client, registers the non-static global IP address of the DDNS server included in the DDNS server information, wherein the DDNS server information registration portion comprises:
a reception portion that receives the authentication message; and
a DDNS server authentication portion that transmits/receives the authentication data to/from the DDNS server and authenticates the DDNS server, wherein the DDNS server authentication portion comprises an authentication data generation and transmission portion that receives the authentication message, generates the authentication data and transmits the authentication data to the DDNS server; and
a DDNS client information notification portion notifying the relationship between the domain name of the DDNS client and the non-static global IP address of the DDNS client to the DDNS server,
wherein the authentication data transmission/reception portion generates a first hash value using the authentication data received from the DDNS client and an encrypted key, and transmits the first hash value to the DDNS client, and
wherein the DDNS server authentication portion generates a second hash value using the authentication data and the encryption key, and compares the second hash value and the first hash value received from the DDNS server.

2. A global address management method for a domain name system having a DDNS server assigned with a non-static global IP address and a DDNS client assigned with another non-static global IP address,
wherein the DDNS server comprises:
a DDNS client information registration portion that registers DDNS client information indicating a relationship between a domain name of the DDNS client and the non-static global IP address of the DDNS client;
a responding portion that, in response to a request for resolving a name from the DDNS client, extracts the corresponding non-static global IP address from the DDNS client information and responds to the DDNS client; and
a DDNS server information notification portion that notifies DDNS server information to the DDNS client registered by the DDNS client information registration portion, wherein the DDNS server information notification portion comprises:
a transmission portion that transmits an authentication message, including transmission source address information, to the DDNS client; and
an authentication data transmission/reception portion that transmits/receives authentication data to/from the DDNS client, and wherein the DDNS client comprises:
  a DDNS server information registration portion that registers the non-static global IP address of the DDNS server included in the DDNS server information, wherein the DDNS server information registration portion comprises:
    a reception portion that receives the authentication message; and
    a DDNS server authentication portion that transmits/receives the authentication data to/from the DDNS server and authenticates the DDNS server, wherein the DDNS server authentication portion comprises an authentication data generation and transmission portion that receives the authentication message, generates the authentication data and transmits the authentication data to the DDNS server; and
  a DDNS client information notification portion notifying the relationship between the domain name of the DDNS client and the non-static global IP address of the DDNS client to the DDNS server,
wherein the method comprises the steps of:
notifying, with the DDNS server information notification portion, at a time when the non-static global IP address of the DDNS server is updated or at a predetermined scheduled time, the DDNS server information, which includes the non-static global IP address of the DDNS server, to the DDNS client that has been registered by the DDNS server;
registering, with the DDNS server information registration portion, when the DDNS server notifies the DDNS server information to the DDNS client, the non-static global IP address of the DDNS server included in the DDNS server information;
notifying, with the DDNS client information notification portion, indicates the relationship between the domain name of the DDNS client and the non-static global IP address of the DDNS client to the DDNS server;
generating, with the authentication data transmission/reception portion, a first hash value using the authentication data received from the DDNS client and an encrypted key, and transmitting the first hash value to the DDNS client; and
generating, with the DDNS server authentication portion, a second hash value using the authentication data and the encryption key, and comparing the second hash value and the first hash value received from the DDNS server.

* * * * *